June 5, 1956  C. E. HILL  2,749,058
SPINNING REEL
Filed Aug. 22, 1952  2 Sheets-Sheet 1
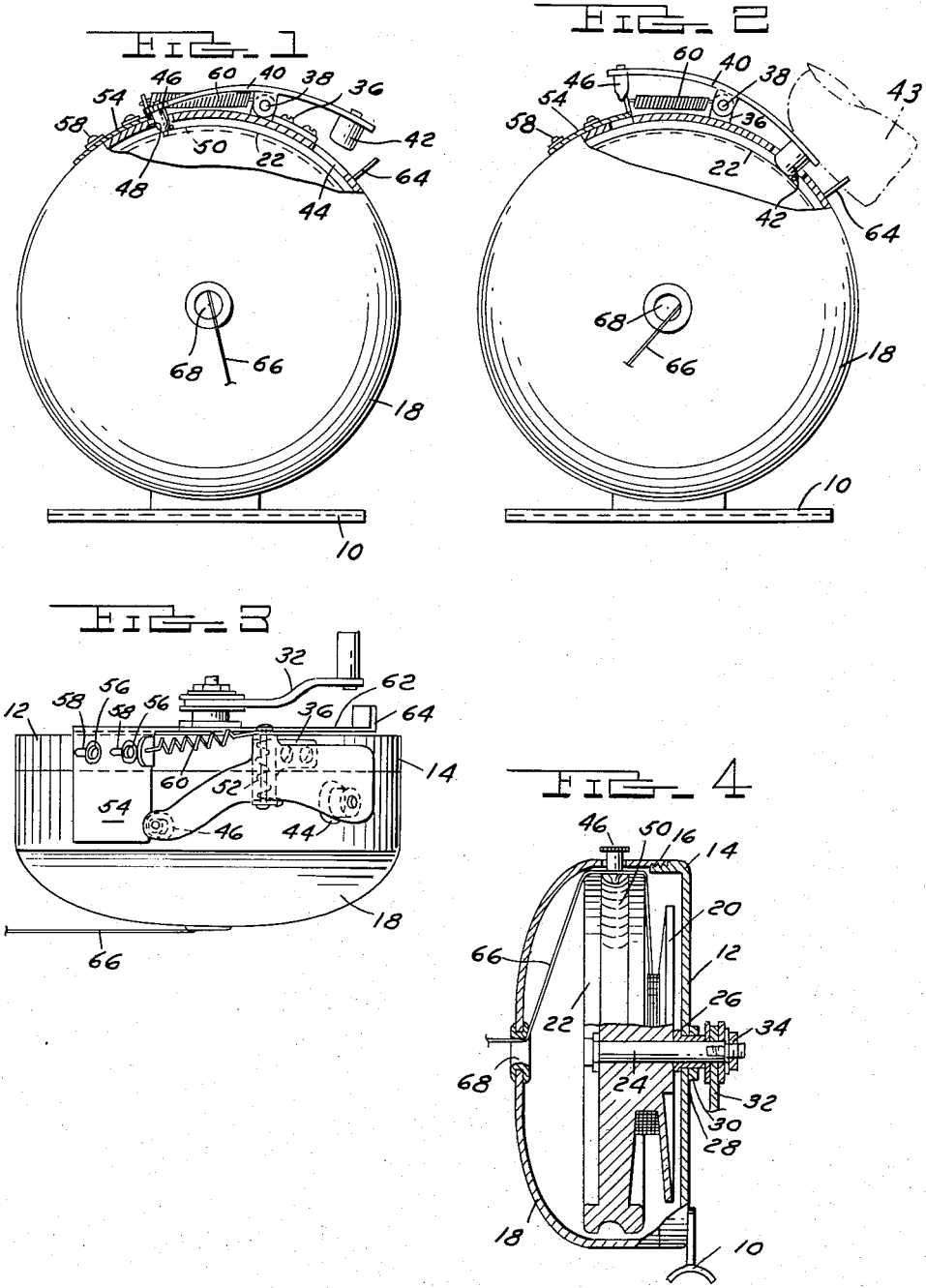
INVENTOR.
CARSON E. HILL
BY
Barnes, Kisselle, Laughlin & Raisch
ATTORNEYS June 5, 1956  C. E. HILL  2,749,058
SPINNING REEL
Filed Aug. 22, 1952  2 Sheets-Sheet 2
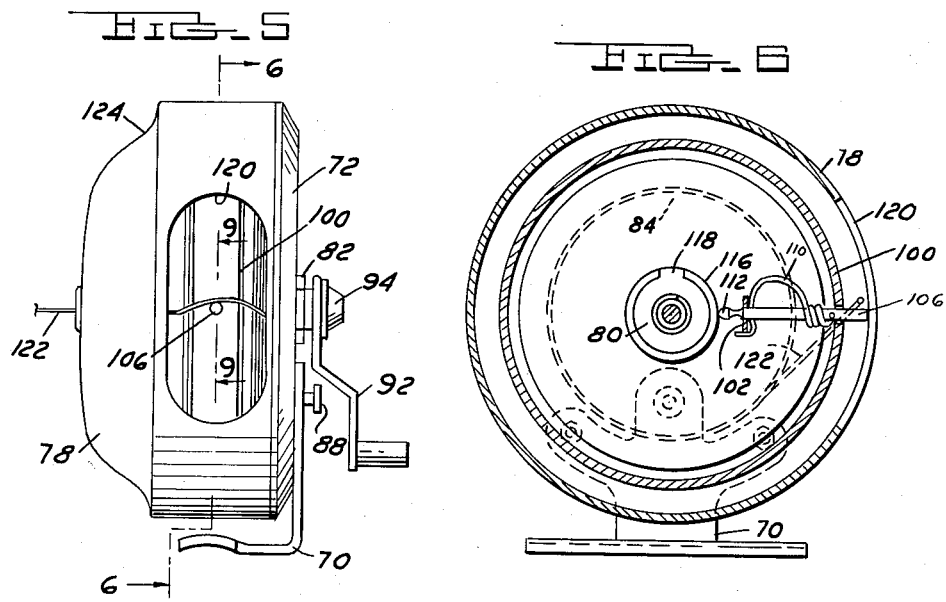
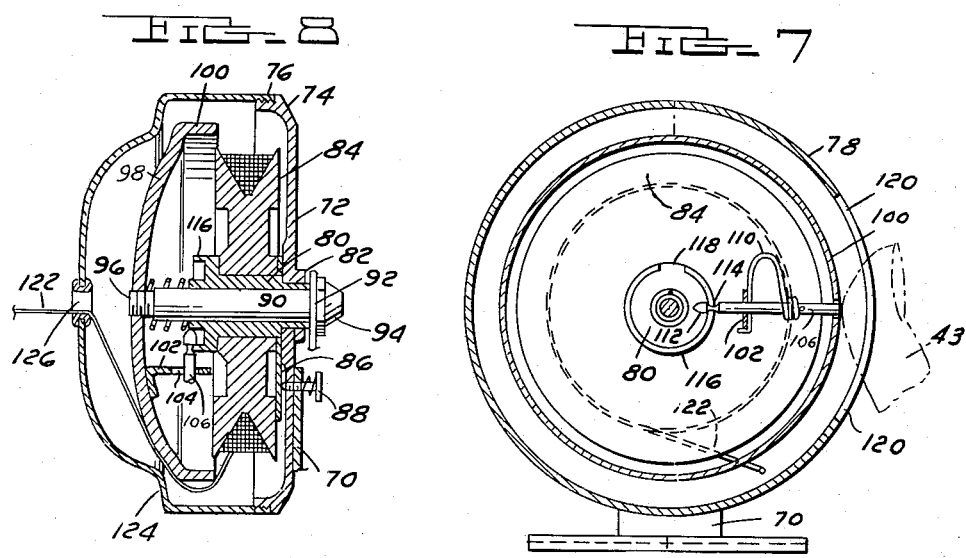
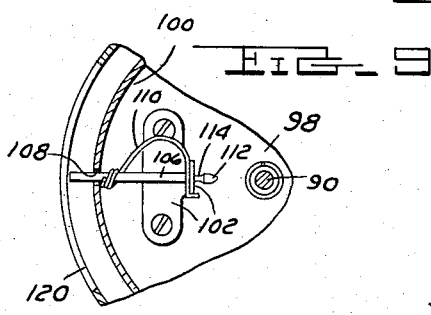
INVENTOR.
CARSON E. HILL
BY
ATTORNEYS

United States Patent Office 2,749,058
Patented June 5, 1956

2,749,058

SPINNING REEL

Carson E. Hill, Greenville, Mich.

Application August 22, 1952, Serial No. 305,734

4 Claims. (Cl. 242—84.5)

This invention relates to a spinning reel. It is an object of this invention to provide a spinning reel which is designed such that it can be used in generally the same manner as a conventional fishing reel.

One of the disadvantages of spinning reels with which I am familiar arises from the fact that such reels are operated in an altogether different manner from conventional reels. The operation of casting is especially different. With a conventional reel, when the user desires to make a cast, he presses his thumb on the line spool and whips the rod forwardly, and simultaneously lifts his thumb from the spool so that the line will unwind. As soon as the line hits the water, the user again presses with his thumb on the line spool to prevent backlash.

The present invention contemplates a spinning reel which is designed to be used in generally the same manner as the conventional reel, that is, the reel is designed such that the user controls the unreeling of the line from the spool by means of his thumb, as he would normally with a conventional reel.

In the drawings:

Fig. 1 is a side elevation, partly in section, showing one form of reel of the present invention with the line pickup finger in the line engaging position.

Fig. 2 is a view similar to Fig. 1, but showing the line pickup finger in the disengaged position, and with the brake member depressed so as to snub the line pickup disk.

Fig. 3 is a top elevation of the reel illustrated in Figs. 1 and 2.

Fig. 4 is a sectional view of the reel.

Fig. 5 is an end elevation of a reel of modified construction.

Fig. 6 is a sectional view taken substantially along the line 6—6 of Fig. 5.

Fig. 7 is a view similar to Fig. 6 and showing the parts in a different operative position.

Fig. 8 is a sectional view of the reel shown in Fig. 5, taken on a plane through the axis of the reel.

Fig. 9 is a fragmentary sectional view taken substantially along the line 9—9 of Fig. 5.

Referring to the drawings, and particularly to Figs. 1 through 4, wherein one form of reel of this invention is illustrated, the reel there shown comprises a conventional support 10 which is arranged to be mounted in the saddle or other device (not illustrated) ordinarily provided on the handle of a fishing rod for mounting a reel thereon. A circular plate 12 is rigidly secured to the support 10. Plate 12 has an axially extending circumferential flange 14 which is threaded as at 16 to receive a cover 18. Plate 12 and cover 18 cooperate to form a housing for a line spool 20 and a line pickup disk 22. Spool 20 and disk 22 are preferably fashioned as a single member and are fixedly supported on a shaft 24 which is in turn rotatably supported in a bushing 26 retained within an opening 28 at the axial center of plate 12 by a nut 30. A handle 32 is fixed to the outer end of shaft 24 as by a nut 34.

At the top side of plate 12 there is arranged a bracket 36 on which is pivotally supported, as at 38, a lever 40. The pivotal connection 38 is disposed intermediate the ends of lever 40 and is arranged to permit pivotal movement of the lever 40 on an axis generally parallel to the axis of shaft 24. The rear end portion of lever 40 is provided with a downwardly projecting snubbing block or brake 42. Cover 18 is provided with an opening 44 which registers with brake 42 so that when the rear end of lever 40 is depressed the brake 42 snubs against the periphery of disk 22. As is shown best in Fig. 2, it will be observed that the rear end portion of lever 40 and brake 42 are positioned such as to be conveniently manipulated by the thumb 43 of the hand in which the fishing rod handle is gripped.

At its forward end, lever 40 is provided with a downwardly projecting line pick-up finger 46 and cover 18 is accordingly provided with an aperture 48 which registers with finger 46. When lever 40 is pivoted in a counterclockwise direction as viewed in Figs. 1 and 2, pickup finger 46 is projected through opening 48 and into a circumferential groove 50 around the periphery of disk 22. Lever 40 is normally biased in a counterclockwise direction by a torsion spring 52 (Fig. 3). A flat cover plate 54 is slidably mounted on plate 12 as by screws 56 which engage within elongated slots 58 on plate 54. A tension spring 60 acting between bracket 36 and plate 54 normally tends to draw plate 54 circumferentially around flange 14 to a position wherein plate 54 overlies opening 48. Plate 54 is fashioned with a rearward extension 62 terminating in a thumb piece 64 which is normally disposed adjacent the rear end of lever 40.

When it is desired to use the reel illustrated in Figs. 1 through 4, the line 66 is extended from the spool 20 around the edge of disk 22 and through an axial opening 68 in cover 18. When the thumb piece 64 is shifted forwardly, plate 54 uncovers opening 48 and finger 46 projects downwardly through opening 48 and into the peripheral groove 50 on disk 52. When the reel is in this condition and handle 32 is rotated, it will be observed that the line will be engaged by finger 46 and wound onto spool 20 as the spool is rotated. When it is desired to cast out line, the operator simply depresses the rear end of lever 40, thus rotating finger 46 and projecting brake 42 into snubbing engagement with the periphery of disk 22. In this position it will be observed that the line is permitted to slither around disk 22 until it contacts brake 42. Brake 42 therefore prevents disk 22 and spool 20 from rotating and also prevents the line 66 from being unwound from spool 20. As the operator whips the rod forwardly, he releases lever 40 thus permitting the line 66 to slither freely off the spool 20. It will be observed that when lever 40 is released by the thumb of the operator it pivots by reason of spring 52 in a counterclockwise direction. However, at the same time, spring 60 has retracted plate 54 to a position overlying opening 48 and finger 46 is thereby prevented from projecting into opening 48. After sufficient line has been paid out the operator simply depresses the rear end of lever 40 thereby projecting brake 42 into engagement with the periphery of disk 22. The line 66 is thereby engaged by brake 42 and the brake also prevents the spool from rotating thus preventing the line from being further unwound.

The reel illustrated in Figs. 5 through 9 also includes a support 70, a plate 72 having a circumferential flange 74 threaded as at 76 to receive a cover 78. Through the axial center of plate 72 there is fixedly supported a bushing 80 clamped on plate 72 as by a nut 82. A line spool 84 is journalled on bushing 80. The rotation of spool 84 on bushing 80 is resisted by a disk 86 which may be brought to bear with greater or lesser pressure against one face of spool 84 by a thumb screw 88 which is threaded through plate 72. A shaft 90 is rotatably journalled within bushing 80 and has one end portion thereof projecting outwardly through plate 72 and supporting a handle 92 which is secured to the end of the shaft in a non-rotatable manner by a cap screw 94. At its inner end shaft 90 has secured thereto, as by a threaded connection 96, a circular disk 98, having an axially extending circumferential flange 100. On the inner face of disk 98 there is mounted a bracket 102 provided with an opening 104 elongated in a direction parallel to the axis of shaft 90, see Fig. 8. A pin 106 projects through the opening 104 and through a registering opening 108 in the circumferential flange 100 of disk 98. A spring 110 normally biases pin 106 radially outwardly through opening 108 and axially in opening 104 in a direction toward the cover 72. The inner end of pin 106 is provided with a tapered head 112 separated from the shank of pin 106 by a reduced neck portion 114. The inner end of bushing 80 is fashioned with a circumferential flange 116 which is notched as at 118 to accommodate the head 112 of pin 106. Cover 78 is provided with a thumb opening 120 disposed such that the thumb of the hand in which the rod is held can be readily extended and projected through the opening 120. Opening 120 exposes a portion of the circumferential flange 100 of disk 98.

Some types of fishing line tend to be quite resilient and therefore to prevent the line 122 from jumping over pin 106, cover 78 is preferably fashioned with a circumferential shoulder 124 which extend radially outwardly of the outer end of pin 106. Thus shoulder 124 causes the line to extend toward axially centered opening 126 in cover 78 along a line spaced radially inwardly of the outer end of pin 106 and thereby prevents the line from jumping over pin 106 when in the projected position.

In operation the reel illustrated in Figs. 5 through 9 is manipulated in a manner generally similar to the reel disclosed in Figs. 1 through 4. The line 122 is extended from the stationary spool 84 around disk 98 and outwardly through axial opening 126 in the face of cover 78. Pin 108 is normally projected by spring 110 to a position projecting radially outwardly through opening 108. Therefore, with the pin in this position, when handle 92 is rotated to reel in the line, the pin 106 revolves around spool 84 to a position wherein it picks up the line 122 and winds it on spool 84. When it is desired to pay out line, handle 92 is rotated to a position wherein pin 108 is accessible through opening 120. With the disk 98 in this position the operator simply projects his thumb through opening 120 and depresses pin 106. When pin 106 is depressed the head 112 of the pin is engaged by the flange 116 of bushing 80 and the pin is pivoted to an inclined position wherein the flange 116 engages within the neck portion 114 of the pin to hold the pin in the retracted position, that is, a position wherein the upper or outer end of the pin is depressed below the peripheral surface of flange 100. In this position it will be observed that the line is free to slither off the spool 84. With the reel in this condition, the operator may cast by simply inserting his thumb through opening 120 to thereby prevent disk 98 from rotating. As the operator whips the rod forwardly, he retracts his thumb from within the opening 120, thereby permitting the line to freely slither off the spool. When sufficient line has been payed out in this manner the operator simply inserts his thumb through the opening 120 to snag the line as it is slithering off the spool. Thereafter, when it is desired to reel in the line, the operator simply turns handle 92 in a direction for reeling in line. The neck 114 of pin 106 rides around the circumferential flange 116 of bushing 80 until the pin registers with notch 118. At this position spring 110 pivots pin 106 into notch 118 and shifts the pin radially outwardly through opening 108 so that in its rotation the pin picks up the line and winds it on the spool.

It will be observed that in both the embodiments illustrated the reel is manipulated in somewhat the same general manner that conventional reels are manipulated. In each case the control of the unwinding of the line is achieved by using the thumb as a brake member. In the one case the thumb is used for projecting the brake member 42 into engagement with the line pickup disk 22, and in the other case the thumb actually snubs the pickup disk 98 to catch the line. Thus any fisherman who is accustomed to casting with a conventional reel is enabled to use the spinning reel of this invention in the same general manner.

I claim:

1. A spinning reel comprising a generally cylindrical housing, means on said housing for mounting the housing on the handle of a fishing rod such that the axis of the housing extends transversely of the axis of the rod, a line spool within said housing and coaxial therewith, an end wall of said housing having an opening at the axial center thereof through which the line from said spool is arranged to pass, a rotatable disk supported coaxially relative to the spool and positioned between said spool and said opening, said disk having a circumferential axially extending flange over which the line slithers as it unwinds from said spool, a radially shiftable pin on said disk movable to and from a position projecting radially outwardly through said flange, said pin when in said projected position engaging the line to wind the line on the spool when the disk is rotated, said housing having an opening in the circumferential wall thereof which is aligned generally axially with said pin and said circumferential wall of said disk, said opening being positioned within the reach of the thumb of the hand in which the rod handle is gripped so that said pin may be actuated from without said housing through said opening, means normally biasing said pin in said radially outwardly projected position, means arranged to interengage said pin in response to movement of the pin radially inwardly to a depressed position out of engagement with the line and hold said pin in said depressed position and means for releasing said last mentioned means from interengagement with said pin.

2. The combination set forth in claim 1 wherein the inner end of said pin is provided with a tapered head separated from the body of the pin by a reduced neck portion, said means for interengaging said pin comprising means spaced radially inwardly of said circumferential flange and providing a fixed concentric circumferential flange disposed in the path of movement of said pin, said second circumferential flange having a notch in the edge thereof through which the pin is free to pass, said pin being rockably supported on said disk so that when the pin is depressed said neck portion engages the edge of said second flange to hold the pin in a depressed position until the disk is rotated to a position wherein the pin is aligned radially with said notch, said spring means biasing said pin in a direction radially outwardly and in an axial direction wherein said neck portion engages said second flange when the pin is depressed.

3. The combination set forth in claim 2 wherein said housing is provided with a circumferential shoulder spaced axially adjacent said circumferential flange of said disk, said shoulder extending radially inwardly beyond the outer end of said pin when in projected position.

4. A spinning reel comprising a generally cylindrical housing, means on said housing for mounting the housing on the handle of a fishing rod such that the axis of the housing extends transversely of the axis of the rod, a line spool within said housing and coaxial therewith, an end wall of said housing having an opening at the axial center thereof through which the line from said spool is arranged to pass, a rotatable disk supported coaxially relative to the spool and positioned between said spool and said opening, said disk having a circumferential axially extending flange, a pin on said disk movable radially to a position projecting radially outwardly through said flange, said pin when in said projected position engaging the line to wind the line on the spool when the disk is rotated, said housing having an opening in the circumferential wall thereof positioned such that the thumb of the hand in which the rod handle is gripped may be projected readily therethrough into engagement with said flange, said pin being actuatable by said thumb through said last mentioned opening, the inner end of said pin being provided with a tapered head separated from the body of the pin by a reduced neck portion, means spaced radially inwardly of said circumferential flange and providing a fixed concentric circumferential flange disposed in the path of movement of said pin, said second circumferential flange having a notch in the edge thereof through which the pin is free to pass, said pin being rockably supported on said disk so that when the pin is depressed, said neck portion engages the edge of said second flange to hold the pin in a depressed position until the disk is rotated to a position wherein the pin is aligned radially with said notch, and spring means biasing said pin in a direction radially outwardly and in an axial direction wherein said neck portion engages said second flange when the pin is depressed.

References Cited in the file of this patent

UNITED STATES PATENTS

| | | |
|---|---|---|
| 1,507,638 | Verhey | Sept. 9, 1924 |
| 2,055,358 | Maynes | Sept. 27, 1936 |
| 2,505,653 | Shillman | Apr. 25, 1950 |
| 2,590,369 | Beeler | Mar. 25, 1952 |
| 2,597,318 | Haase | May 20, 1952 |
| 2,602,603 | Blissit | July 8, 1952 |
| 2,621,869 | McCash | Dec. 16, 1952 |
| 2,630,979 | Uerling | Mar. 10, 1953 |
| 2,648,505 | Mauborgne | Aug. 11, 1953 |
| 2,656,992 | Keates | Oct. 27, 1953 |
| 2,689,691 | Peter | Sept. 21, 1954 |
| 2,706,095 | Goodall | Apr. 12, 1955 |